US008533809B1

(12) United States Patent
Zang et al.

(10) Patent No.: US 8,533,809 B1
(45) Date of Patent: Sep. 10, 2013

(54) FORCED STATE-CHANGE TO FACILITATE BLACKLIST EVALUATION

(75) Inventors: Hui Zang, Burlingame, CA (US); Tao Ye, Daly City, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 673 days.

(21) Appl. No.: 12/475,043

(22) Filed: May 29, 2009

(51) Int. Cl.
*G06F 9/00* (2006.01)
*G06F 15/16* (2006.01)
*G06F 17/00* (2006.01)
*G06F 7/04* (2006.01)
*G06F 17/30* (2006.01)
*H04N 7/16* (2011.01)

(52) U.S. Cl.
USPC .................................. 726/13; 726/28; 726/29

(58) Field of Classification Search
None
See application file for complete search history.

(56) References Cited

U.S. PATENT DOCUMENTS

| 5,581,244 | A | * | 12/1996 | Jokimies et al. | 340/7.35 |
| 6,701,160 | B1 | * | 3/2004 | Pinder et al. | 455/550.1 |
| 2003/0193964 | A1 | * | 10/2003 | Bae et al. | 370/465 |
| 2006/0109846 | A1 | * | 5/2006 | Lioy et al. | 370/389 |
| 2007/0037589 | A1 | | 2/2007 | Watson et al. | |
| 2009/0209291 | A1 | * | 8/2009 | Ramprasad et al. | 455/564 |
| 2010/0124223 | A1 | * | 5/2010 | Gibbs et al. | 370/389 |

\* cited by examiner

*Primary Examiner* — Michael S McNally
*Assistant Examiner* — Trong Nguyen (57) ABSTRACT

Methods for evaluating data packets addressed to a wireless communication device are disclosed herein. When in a dormant state, a wireless communication device receives page messages indicating a source of data packets addressed to the wireless communication device and determines whether the data packets represent unwanted traffic. When in an active state, the wireless communication device examines data packets to determine if the received packets represent unwanted traffic, and in response to determining that the traffic is unwanted, the wireless communication device transitions into a dormant state or enters an idle state from which the wireless communication can transition into the dormant state.

13 Claims, 5 Drawing Sheets

FORCED STATE-CHANGE TO FACILITATE BLACKLIST EVALUATION

BACKGROUND

As wireless communication systems continue to grow in popularity, functionality, and connectivity to the Internet, the level of unwanted traffic on wireless communication systems has also continued to grow. Beyond the frustration and annoyance experienced by a user who receives unwanted traffic, such unwanted traffic can negatively impact a user's ability to use a wireless communication system. For example, unwanted traffic can congest the wireless communication system, cause an undesirable drain on the batteries of wireless communication devices, and even cause software crashes on wireless communication devices.

In addition to negatively impacting system performance, such unwanted traffic can pose more serious risks to users of a wireless communication system if the unwanted traffic contains malicious software code, including programs designed to harvest sensitive user data and damage other software applications stored on a wireless communication device. In wired networks, traditional techniques such as firewalls and anti-virus software have been used to provide a limited degree of protection to devices connected to the wired network. However, these wired-network techniques are not well suited to addressing the ways in which unwanted traffic negatively impacts a wireless communication system.

OVERVIEW

Unwanted traffic on wireless communication systems can take the form of unwanted data packets addressed to wireless communication devices within the wireless communication system. A wireless communication device can limit the impact such unwanted data packets may have by evaluating data packets that are addressed to the wireless communication device and responding to a determination that the incoming data packets represent unwanted traffic.

Disclosed herein are methods for evaluating data packets addressed to a wireless communication device. In one set of exemplary implementations, methods for evaluating data packets addressed to a wireless communication device comprise: (i) configuring a wireless communication device to be in a dormant mode; (ii) receiving at the wireless communication a page message indicating that a data packet has been addressed to the wireless communication device; (iii) determining whether a source of the data packet is included in a list of data packet sources; and (iv) in response to determining that the source of the data packet is included in a list of data packet sources, transmitting a message from the wireless communication device indicating that the data packet should not be sent to the wireless communication device.

In another set of exemplary implementations, methods for evaluating a data packet addressed to a wireless communication device comprise: (i) receiving a data packet at a wireless communication device; (ii) determining whether the data packet is an unwanted data packet; and (iii) in response to determining that the data packet is an unwanted data packet, configuring the wireless communication device to be in a dormant mode, so as to invoke the above method for a next packet destined to the wireless communication device.

In another set of exemplary implementations, methods for evaluating a data packet addressed to a wireless communication device comprise: (i) configuring a wireless communication device to be in a dormant mode; (ii) receiving at the wireless communication device a page message indicating that a data packet has been addressed to the wireless communication device; (iii) determining whether a source of the data packet is included in a list of data packet sources; (iv) in response to determining that the source of the data packet is included in a list of data packet sources, transmitting a message from the wireless communication device indicating that the data packet should not be sent to the wireless communication device; (v) in response to determining that the source of the data packet is not included in a list of data packet sources, receiving the data packet at the wireless communication device, determining whether the data packet is an unwanted data packet, and in response to determining that the data packet is an unwanted data packet, configuring the wireless communication device to be in a dormant mode.

These, as well as other aspects and advantages will become apparent to those of ordinary skill in the art by reading the following detailed description, with reference where appropriate to the accompanying drawings.

DETAILED DESCRIPTION OF EXAMPLE EMBODIMENTS

The increase in the use of wireless communication systems to access data networks, including the Internet, has also ushered in an increase in the level of unwanted traffic on wireless communication systems. Such unwanted traffic can cause congestion in the wireless communication system, and negatively impact the ability of users to communicate with others, seek out wanted information, and otherwise take advantage of the capabilities of a wireless communication system. In addition to negatively impacting the user experience, such unwanted traffic can pose more serious threats to wireless communication devices and their users. For example, unwanted traffic may cause some wireless communication devices to function improperly, and may cause the device to expend more power, thus draining the batteries. Further, when such unwanted traffic takes the form of malicious software, the unwanted traffic can threaten the security of sensitive information stored by users on their wireless communication devices, and potentially damage other software stored on the wireless communication device.

The negative impact that unwanted traffic has on the performance of wireless communication systems and wireless communication devices can be attenuated by identifying unwanted data packets that are addressed to a wireless communication device and preventing those packets from being transmitted to the wireless communication device. Disclosed herein are methods for evaluating a data packet that has been addressed to a wireless communication device.

I. NETWORK ARCHITECTURE

A. Example Wireless Communication System

Figure 1:
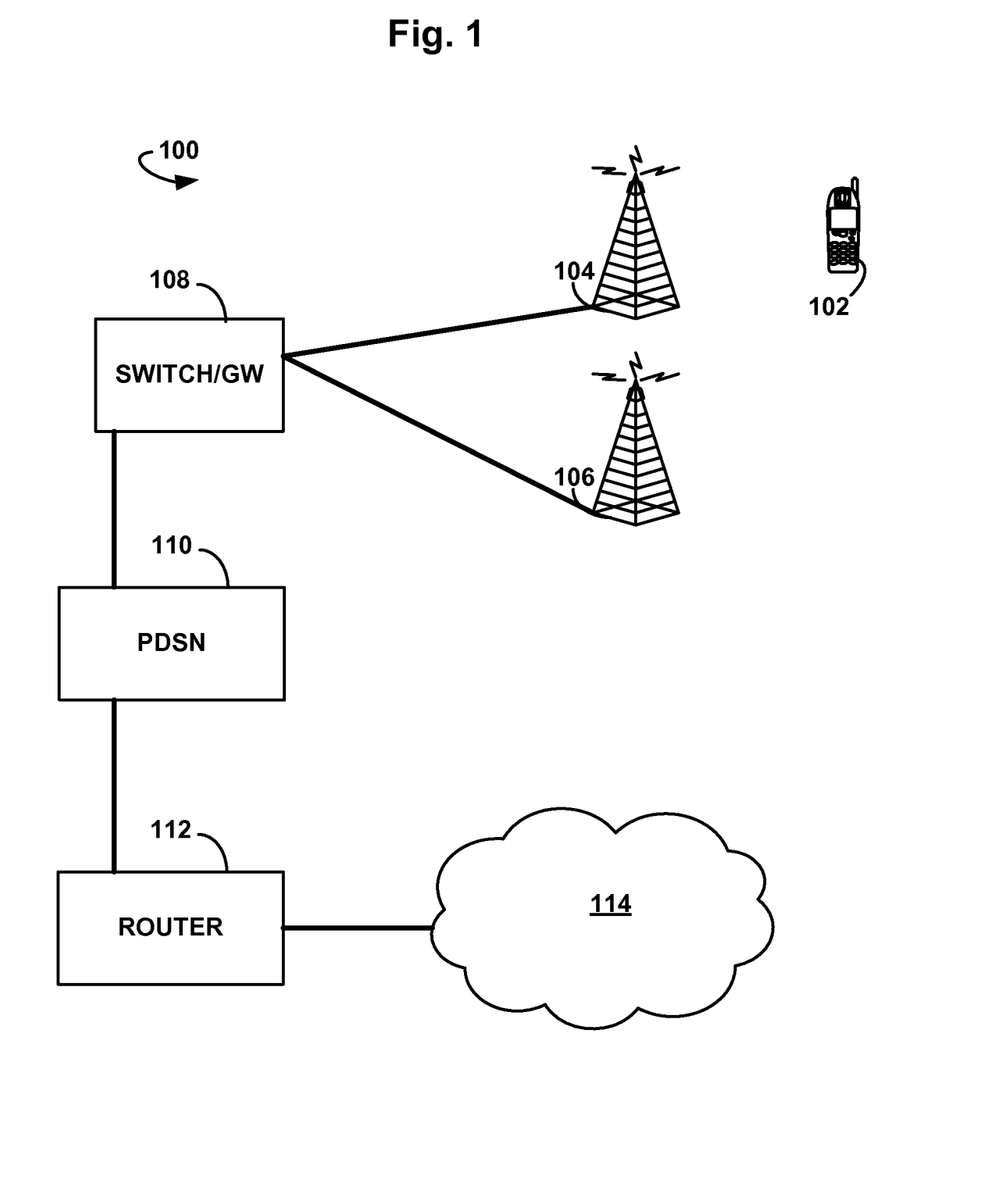
FIG. 1 is a block diagram of a wireless communication network in which exemplary embodiments may be implemented.

FIG. 1 is a simplified block diagram of an exemplary wireless communication system 100, in which example embodiments may be implemented. System 100 includes wireless communication device ("WCD") 102. WCD 102 could be a wireless telephone, wireless personal digital assistant, wirelessly equipped laptop computer, wireless router, or other type of mobile or fixed wireless device. WCD 102 may be a subscriber device, which is manipulated by a human user in order to establish circuit-based or packet-based voice and/or data calls within the wireless communication system 100. However, WCD 102 could also be an automated device without a human interface.

WCD 102 may communicate via an air interface with a base station, such as base station 104 or base station 106. Each base station, such as base station 104 or base station 106, may comprise a number of components that have been omitted for the sake of clarity, such as a base-station transceiver ("BTS"). Over an air interface, base station 104 and WCD 102 can communicate voice and/or data information. Base stations 104 and 106 are also in communication with a switch/gateway 108. In some example wireless communication systems, switch/gateway 108 may be a mobile switching center ("MSC"). In other example wireless communication systems, switch/gateway 108 may be part of a radio network controller ("RNC"). Switch/gateway 108 is also in communication with a packet data serving node ("PDSN") 110, which facilitates packet-based communication of information within the system 100. PDSN 110 is in turn in communication with a router 112, which facilitates communication between the wireless communication system 100 and other systems 114, such as the Internet. In some implementations, the PDSN 110 performs the functions of the router 112, and facilitates communication between the wireless communication system 100 and other systems.

B. The Paging Process

In order to establish communication with a particular WCD, it is often necessary to locate the WCD within the wireless communication system. A WCD can be located within a wireless communication system by broadcasting a page message over an area within the wireless communication system. For example, in system 100 depicted in FIG. 1, when switch/gateway 108 receives a notification that a data packet is addressed to WCD 102, switch/gateway 108 may transmit a page message to base stations 104 and 106, which in turn broadcast the page message over their respective air interfaces. If WCD 102 acknowledges the page message and sends a reply message over an air interface to base station 104, base station 104 can in turn send a message to switch/gateway 108 indicating that WCD 102 has been located. In response, switch/gateway 108 can then transmit a channel assignment to WCD 102 via base station 104, or switch/gateway 108 can direct base station 104 to assign a channel to WCD 102, and communication can proceed. When a channel is assigned to WCD 102, WCD 102 is in an active mode, wherein the WCD 102 receives data packets from the wireless communication system without evaluating a page message for each packet transmitted to the WCD 102.

Page messages are sent via a paging channel on the air interface between a wireless communication device and the wireless communication system. In some implementations, the paging channel in a coverage area is divided, or slotted, into cycles of 32 or 64 slots. In such slotted implementations, a wireless communication device within the coverage area is assigned to a particular slot, monitors the information in its assigned slot in the paging channel, and can ignore information in other slots on the paging channel.

Information sent via the paging channel can include overhead messages from the wireless communication system and paging messages that are directed to a particular wireless communication device. For example, paging messages directed to a particular wireless communication device may include paging requests indicating that an incoming call, SMS messages, voicemails, or other data has been directed to the particular mobile device. Channel assignments for a particular wireless communication device are also sent via the paging channel.

In some wireless communication systems, the air interface between the wireless communication device and the wireless communication system also includes an access channel. A wireless communication can use the access channel to send a message to the wireless communication system. For example, a wireless communication device may send an access probe to the wireless communication system in order to register with the system. A wireless communication device also uses the access channel to respond to a page message received via a paging channel.

Wireless communication systems also include one or more traffic channels within the air interface. A traffic channel is used to carry information such as voice calls, text messages, and other packet-based information between the wireless communication device and the wireless communication system. When a wireless communication device responds to a page message and a channel is assigned to that wireless communication device, communication between the wireless communication device and the wireless communication system can actively take place via the traffic channel.

II. EXAMPLE IMPLEMENTATIONS OF METHODS FOR EVALUATION OF DATA PACKETS

Figure 2:
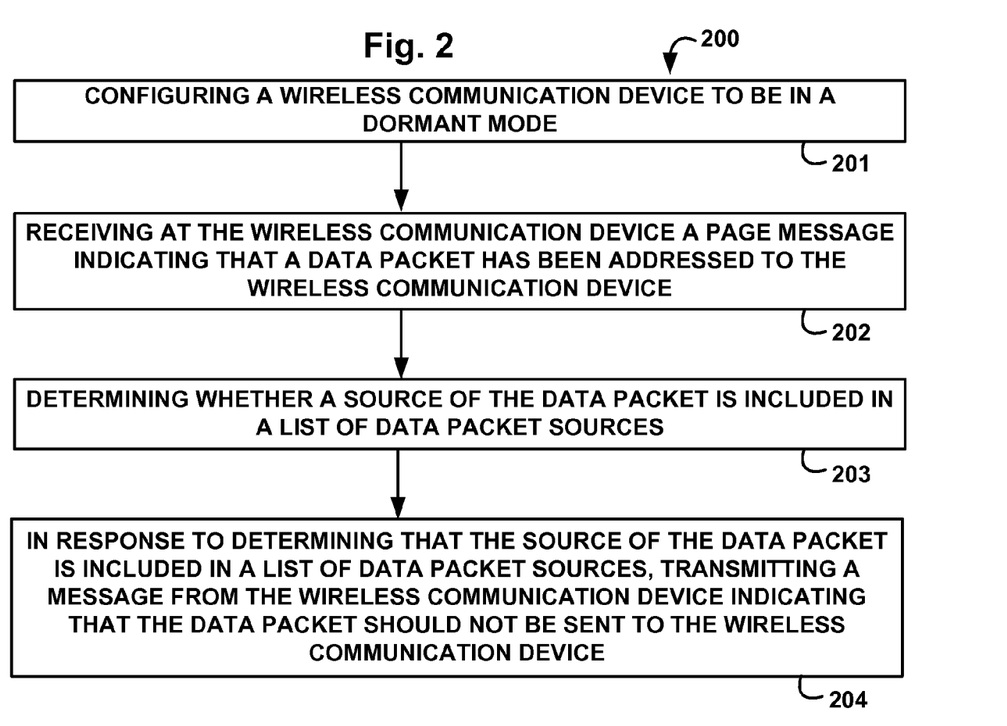
FIG. 2 is a flow chart depicting a method in accordance with a first example embodiment.

FIG. 2 is a flow chart depicting an example implementation of a method 200 for evaluating a data packet addressed to a WCD. As depicted by element 201, the method 200 begins with a wireless communication device in a dormant mode. In some implementations, software instructions executed by a processor within the WCD are used to cause the WCD to enter the dormant mode. For example, if no traffic is directed to the WCD within a predetermined interval of time, expiration of the interval of time triggers a transition to the dormant state. In another example implementation, instructions sent from the wireless communication system to the WCD are used to trigger a transition to the dormant state. When a WCD is dormant, the WCD is paged by the wireless communication system when a data packet is addressed to the WCD. If the WCD responds to the page message, a channel is assigned to the WCD.

As depicted by element 202, the method 200 also comprises receiving at the wireless communication device a page message indicating that a data packet has been addressed to the wireless communication device. While in the dormant mode, the WCD continues to monitor a paging channel timeslot to determine if any traffic has been addressed to the WCD. When traffic is addressed to the WCD, a page message is sent from the MSC over the air interface to the WCD. In some implementations, page messages take the form of a list of numbers that identify a particular wireless communication device, such as 123-456-7890. However, in other example implementations, the content of the page message is expanded by the MSC to comprise an identifier of the source of the data packet, such as an IP address, or an IP address with a port identifier. In some example implementations, the IP address information and the port identifier information is provided to the MSC by the PDSN when the PDSN has a packet available for transmission to the WCD. For example, an expanded page message may take the form of 123-456-7890 (yyy.yyy.yyy.yyy) or 123-456-7890 (yyy.yyy.yyy.yyy/zzzz), where yyy.yyy.yyy.yyy is an IP address, such as the IP address of the source of the traffic directed to the WCD, and zzzz is a port identifier. In another example, the page message may alternate between a typical page message and an expanded pages message that includes the source identification information. In one example, the page message may take the form of 123-456-7890 (yyy.yyy.yyy.yyy/zzzz) 123-456-7890. In another example, an expanded page message is sent in a first cycle of the paging channel, and a typical page message is sent in a second cycle of the paging channel.

In element 203, the method comprises determining whether a source of the data packet is included in a list of data packet sources. When the WCD receives a page message that indicates the source of a data packet, the WCD extracts the source identification data from the page message and compares the source identification to a list of data packet sources. In some example implementations, the list of data packet sources is a blacklist stored in memory accessible by the WCD, and comprises a list of sources associated with unwanted data packets. This list may be modifiable by a user of the WCD. For example, an interface on the WCD allows the user to add and/or delete sources identified on the list in order to block or accept data packets from a specific source. The list may comprise any source identification information, including IP addresses associated with sources of unwanted data packets.

As depicted in element 204, the method 200 comprises in response to determining that the source of the data packet is included in a list of data packet sources, transmitting a message from the wireless communication device indicating that the data packet should not be sent to the wireless communication device. In an example implementation, the WCD sends a reply via the access channel indicating that the addressed WCD is present within a particular coverage area, but that the data packet should not be sent to the WCD. Upon receiving the indication that the data packet should not be sent to the WCD, the MSC notifies the PDSN or other wireless communication system component storing the data packet, which can in turn drop, delete, or otherwise cease transmission of the refused data packet.

In some implementations, a copy of the list of data packet sources is stored elsewhere in the wireless communication system, and updated to match the list used by the WCD. In one example, the PDSN stores a list associated with each WCD that has received a packet from the PDSN. If a source on the list associated with a particular WCD attempts to send a packet to the particular WCD, the PDSN may act to drop the packet without paging the WCD. Further, when the WCD refuses a packet and the MSC instructs the PDSN to drop the packet, the PDSN can also update the list stored with the PDSN to reflect the rejection by the WCD. In response to receiving the indication that the data packet should not be sent to the WCD, the MSC, PDSN, or other wireless system component storing the data packet also adds the source of the data packet to a list of blocked sources associated with the particular WCD. In example implementations in wireless communication systems implementing a 3GPP protocol, signaling between the PDSN and the switch/gateway, such as an MSC, can be implemented through the A10/A11 interface, which establishes a Generic Routing Encapsulation (GRE) tunnel, and through the existing Point-to-Point Protocol (PPP) connection between the PDSN and the WCD.

If some example implementations, the WCD also compiles additional information related to the attempted transmission of unwanted packets. When the WCD rejects a data packet from a source on the list of blocked sources, the WCD updates the list of data packet sources to reflect that the blocked source attempted to send a data packet to the WCD. For example, the WCD may record information such as when the unwanted data packet was sent or how many data packets from a particular source have been refused by the WCD. This information could be used, for example, to track or monitor how frequently a particular source sends unwanted data packets, the quantity of data packets sent by a particular source, and the extent to which unwanted traffic impacts the ability of a wireless communication device to receive wanted traffic.

Figure 3:
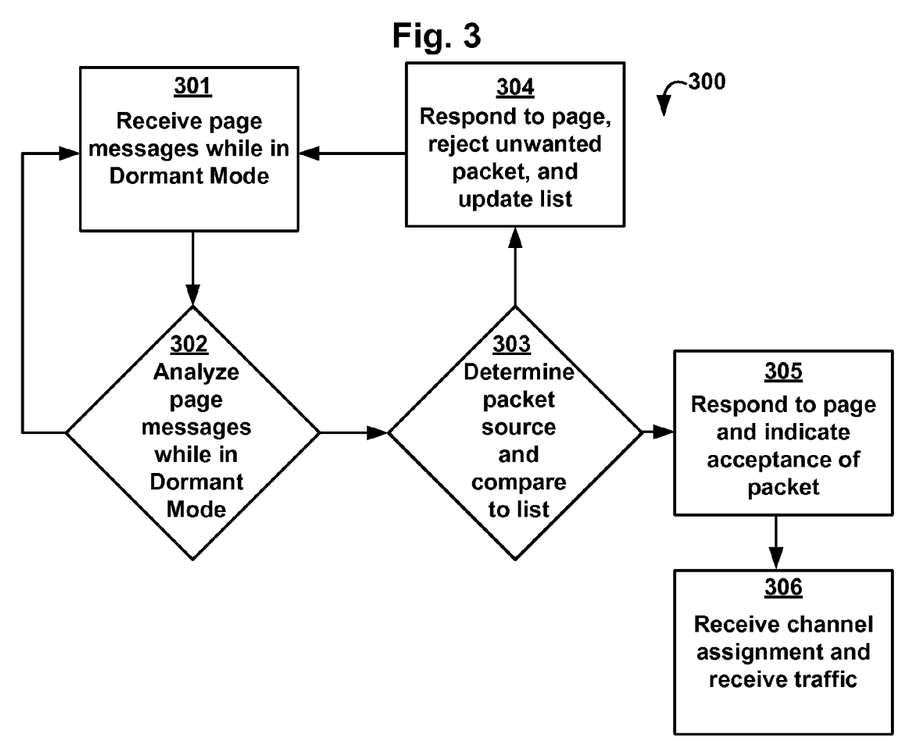
FIG. 3 is a flow chart depicting an implementation of a method in accordance with the first example embodiment.

FIG. 3 is a flow chart of a WCD implementing an example method 300 similar to example method 200. As depicted by block 301, the WCD begins in a dormant mode. In block 301, the WCD receives a paging message broadcast from the wireless communication system. As shown in block 302, while remaining in the dormant mode, the WCD analyzes the page message to determine whether the page message indicates that a data packet is addressed to the WCD. If the page message is not directed to the particular WCD, the WCD remains in the dormant mode, and continues to monitor the paging channel for an indication that a data packet has been addressed to the WCD.

If the page message indicates that a data packet is addressed to the WCD, the WCD remains in a dormant mode and extracts the source identification information stored within the page message to determine the source of the addressed data packet, as shown in block 303. In block 303, the WCD also compares the source identification information to a list of blocked sources. If the addressed data packet is from a source on the list of blocked sources, the WCD sends a reply to the page message received from the wireless communication system via an access channel. In the reply message, the WCD indicates that the WCD has received the page message, and that the addressed data packet should not be transmitted to the WCD, as shown in block 304. In response to receiving the reply via the access channel, the MSC instructs the PDSN to drop the unwanted data packet. In block 304, the WCD also updates the list of blocked sources to reflect the attempted transmission of an unwanted data packet to the WCD. As shown in FIG. 3, after rejecting the data packet, the WCD returns to monitoring the paging channel, and remains in the dormant mode, as shown in block 301.

If the addressed data packet is not from a source on the list of blocked sources, the WCD the WCD sends reply to the page message from the wireless communication system via the access channel to indicate that the page message has been received, as shown in block 305. In block 305, the reply sent by the WCD may also include an indication requesting that the data packet be sent. After replying to the page message, the WCD receives a channel assignment and receives traffic from the wireless communication system, as shown in block 306.

Figure 4:
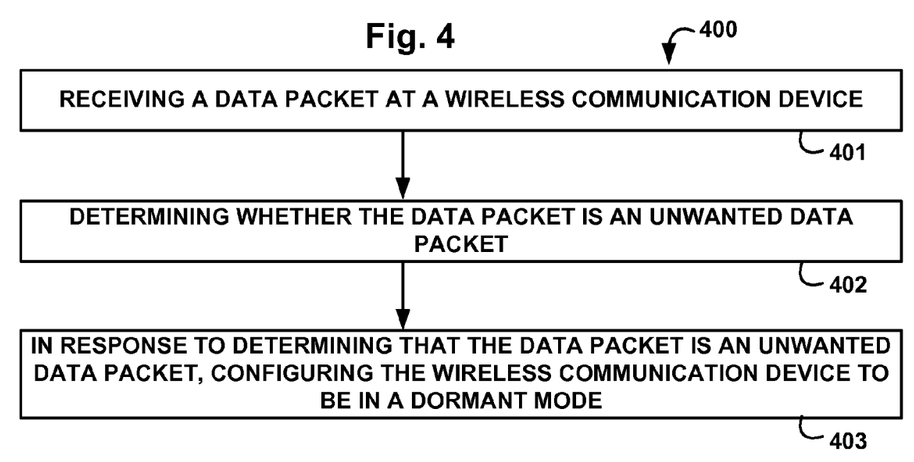
FIG. 4 is a flow chart depicting a method in accordance with a second example embodiment.

FIG. 4 depicts an example implementation of a method 400 for evaluating a data packet directed to a wireless communication device in accordance with a second embodiment. As shown by element 401, method 400 comprises receiving a data packet at a wireless communication device. In FIG. 4, the WCD is in an active state. If the WCD has recently responded a page message, received a channel assignment, and begun receiving data packets, the WCD is no longer in a dormant mode, and will not receive additional page message identifying the source of the packets transmitted to the WCD, because the location of the WCD is known, and data is flowing via a traffic channel to WCD. As such, since the WCD in the active state is not receiving or monitoring page messages that identify the source of a data packet, the WCD may not be able to refuse unwanted data packets before they are sent to the WCD.

As depicted by element 402, the method 400 also comprises receiving a data packet, and determining whether the data packet is an unwanted data packet. In an example implementation, the WCD examines the content of the data packets received by the WCD. For example, the data packet may include an indication of the source of the data packet, such as an IP address. The WCD then compares this source information a list of data packet sources, such as a blacklist accessible by the WCD. The data stored within the data packet may also be examined by the WCD to determine if the data packet is unwanted.

As depicted by element 403, the method 400 also comprises, in response to determining that the data packet is an unwanted data packet, configuring the wireless communication device to be in a dormant mode. In an example implementation, once the WCD recognizes that it has received an unwanted data packet, the WCD transitions to a mode that requires the wireless communication system to send a page message indicating the source of a subsequent data packet to the WCD, and requires the wireless communication system to wait for the WCD to accept the data packet before sending the data packet. Thus, once the WCD recognizes a data packet as an unwanted data packet, the WCD can force itself into a dormant mode and determine whether a subsequent packet is an unwanted packet without actually receiving additional unwanted packets. Further, in addition to configuring the device to be in a dormant mode, the WCD can update the list of blocked sources of data packets to reflect any source information associated with the received, but unwanted data packet.

By forcing itself into a dormant mode, the WCD can stop receiving unwanted data packets, and utilize implementations of the methods described above. Once the WCD is in the dormant mode, the wireless communication system will page the WCD when a subsequent data packet is addressed to the WCD. As described above, the page message from the wireless communication system will include an identification of the source of the data packet. Upon receiving the page message, the WCD extracts the identification information, compares the identification information to a list stored on the WCD, and determines if the data packet is unwanted. If the data packet is unwanted, the WCD responds to the page the page message and indicates that the packet should not be sent, and the WCD remains in the dormant mode.

By forcing itself back into the dormant mode and examining the source of a data packet to determine whether the data packet is an unwanted data packet, the WCD can avoid receiving a large number of unwanted data packets. In many instances, a source of unwanted data packets addresses a plurality of data packets to a WCD. This plurality of packets is stored in the PDSN or other component within the wireless communication system for transmission to the WCD. When the WCD recognizes that a data packet is unwanted and the WCD forces itself into the dormant mode, the WCD adds the source of the data packet to the list of blocked sources, if the source is not already on the list of blocked sources. By forcing itself into the dormant mode, the WCD stops receiving the incoming packets and begins examining the source identification information included in the page message indicating that a packet is addressed to the WCD. As described above, when in the dormant mode, the WCD extracts the source identification information, and if the source of the packet is on the list of blocked sources, the WCD can signal the MSC that the data packet should not be sent to the WCD.

In response to receiving the indication from the WCD that the data packet should not be sent, the MSC instructs the PDSN or other component holding the data packet to drop the packet. In addition, if the MSC, PDSN, or other system component maintains a list of sources blocked by the WCD, that list is updated to include the source of the rejected unwanted data packet. In many implementations, it is likely that the PDSN or other system component is holding additional data packets from the blocked source at the time that a packet from the blocked source is rejected by the WCD. In response to receiving a rejection by the WCD of one packet, the wireless communication system can drop all other packets addressed to the WCD from the blocked source. In some example implementations, the MSC, PDSN, or other system component that can access the list of blocked sources associated with the WCD examines the source of data packets before causing the WCD to be paged. If the data packets are from a blocked source, the wireless communication system will then drop the unwanted packets preemptively, without paging the WCD.

Figure 5:
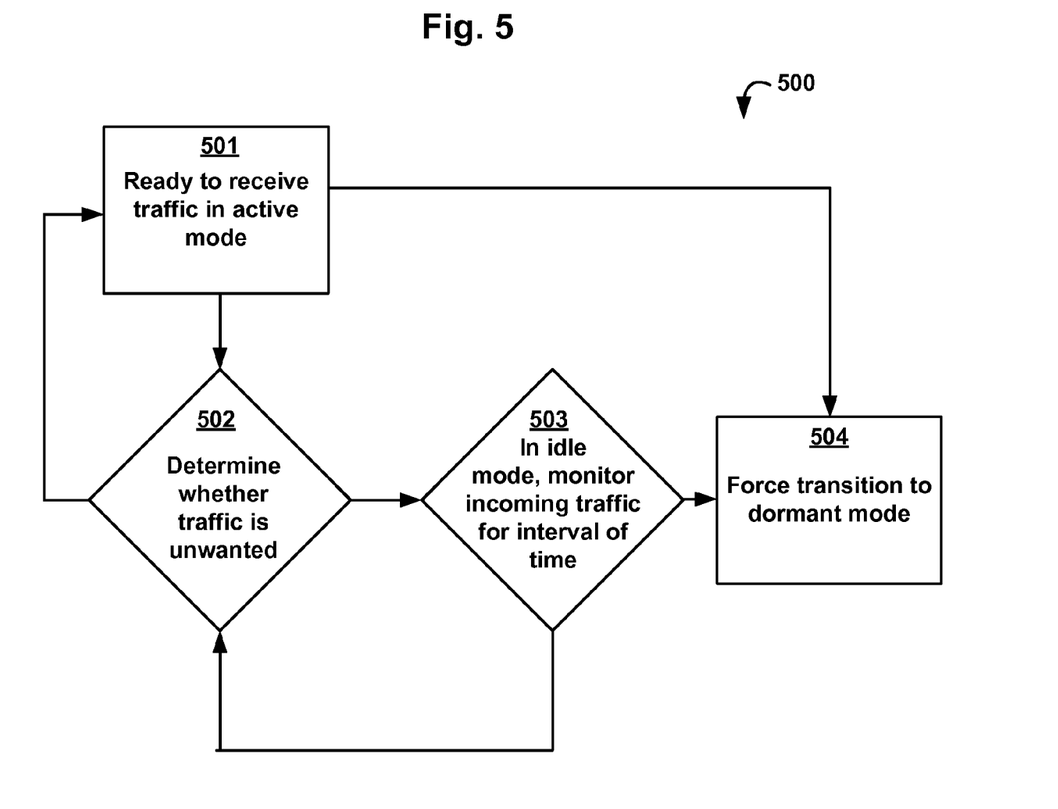
FIG. 5 is a flow chart depicting an implementation of a method in accordance with the second example embodiment.

FIG. 5 is a flow chart 500 of a WCD implementing a method similar to method 400. As shown in block 501, the WCD begins in an active mode, wherein the WCD can receive traffic from the wireless communication system via a traffic channel. As data packets are received by the WCD, the WCD determines whether the traffic is unwanted, as shown in block 502. In determining whether the traffic is unwanted the WCD can use any set of criteria, such as the source of the traffic, the content of the traffic, or other parameters. If the incoming traffic is not unwanted, the WCD may remains in the active state marked and continues to be able to receive traffic from the wireless communication system, as shown in block 501.

If the WCD determines that the traffic is unwanted, or if no traffic is received by the WCD for a predetermined interval of time, the WCD enters an idle mode, marked by block 503, where the WCD continues to monitor any incoming traffic for an additional interval of time. If no wanted traffic is received from the wireless communication system for the additional interval of time, the WCD forces itself into the dormant mode, as shown in block 504. While in the dormant mode, the WCD must be paged by the wireless communication system before receiving any additional traffic. For example, in a wireless communication system using a 3GPP protocol, the forced transition to dormant mode can be implemented through a mobile-initiated release of an active packet data session instance process.

If traffic from the wireless communication system is received by the WCD while in idle state WCD evaluates the any source information contained in the packet and the contents of the data packet to determine whether or not it is unwanted traffic, as shown in block 502. If no traffic is received from the wireless communication system for a predetermined interval of time, the WCD may transition directly from the active mode depicted in block 501 to the idle state depicted in block 503.

Figure 6:
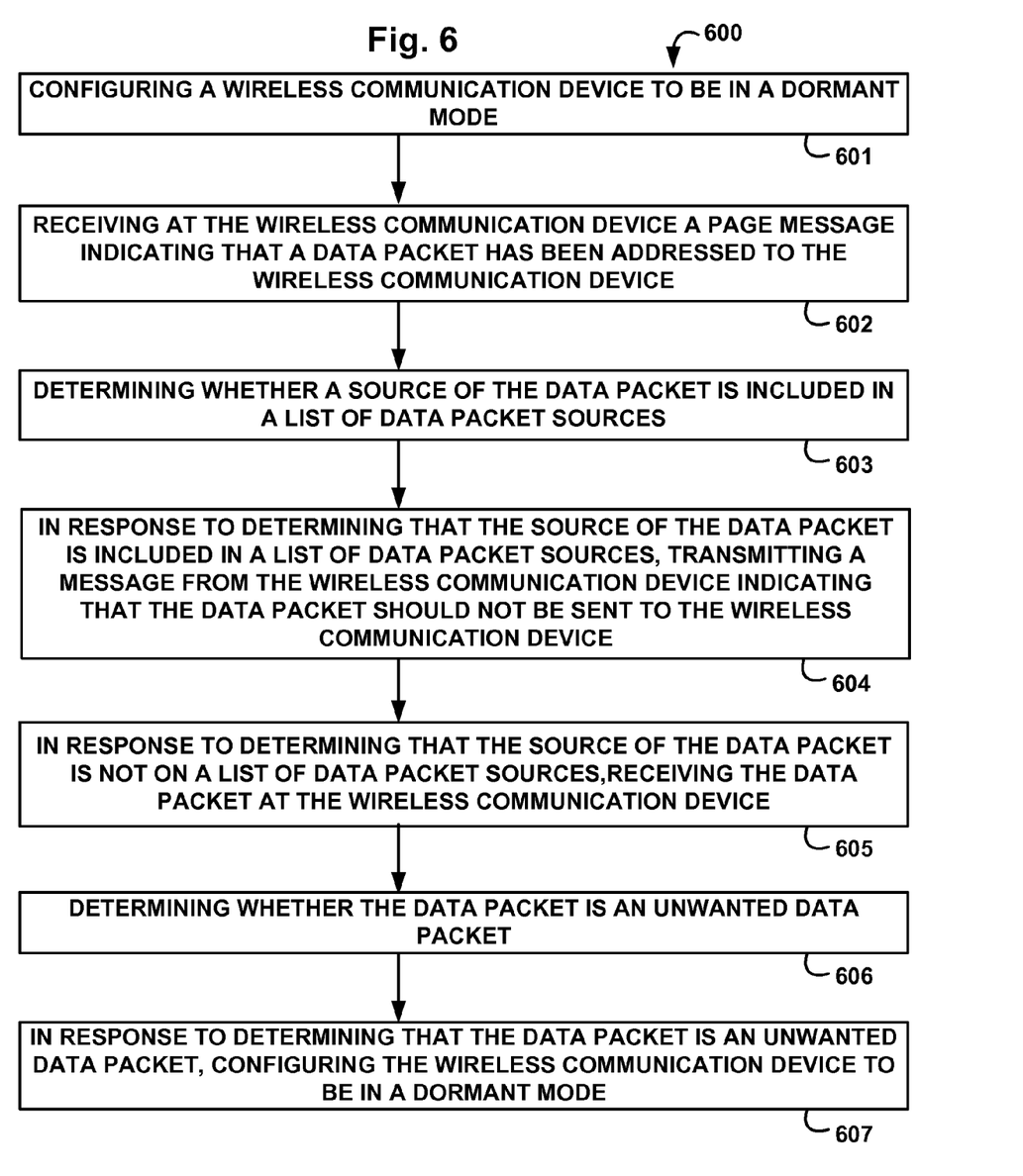
FIG. 6 is a flow chart depicting a method in accordance with a third example embodiment.

FIG. 6 is a flow chart depicting an example method 600 in accordance with a third example embodiment. As shown by element 601, the method 600 comprises configuring a wireless communication device to be in a dormant mode. In element 601, the software executed by a processor within the WCD causes the WCD to stop accepting any traffic transmitted by the wireless communication system and begin monitoring the paging channel to determine if any traffic is addressed to the WCD. As described above, when in a dormant mode, the WCD must be paged by the wireless communication system before the WCD can receive any data packets. As depicted by element 602, the method 600 also comprises receiving at the wireless communication device a page message indicating that a data packet has been addressed to the wireless communication device. As with method 200, the page message is received by the WCD while the WCD is in a dormant state, and the message comprises an identifier of the source of the data packet, such as an IP address, or an IP address with a port identifier.

In element 603, the method 600 comprises determining whether a source of the data packet is included in a list of data packet sources. In element 603, the WCD extracts source information from the received page message, and compares the extracted source information against a list stored in memory on the WCD. As described above, this list may be a blacklist identifying sources associated with unwanted data packets, and may comprise any source identification information, including IP addresses associated with the sources of unwanted data packets. In some example implementations, the list is user-modifiable. As depicted in element 604, the method 600 comprises, in response to determining that the source of the data packet is included in a list of data packet sources, transmitting a message from the wireless communication device indicating that the data packet should not be sent to the wireless communication device. As in method 200, for example, the WCD may send a reply to the page message via the access channel, and indicate to the MSC that the data packet should not be sent to the WCD, and that the unwanted data packet should be dropped by the PDSN.

As shown by element 605, method 600 comprises, in response to determining that the source of the data packet is not on a list of data packet sources, receiving the data packet at the wireless communication device. After receiving the data packet, as shown by element 605, the method 600 also comprises determining whether the data packet is an unwanted data packet, as depicted by element 606. As in method 400, for example, the data packet may be analyzed by the WCD to determine if an indication of the source of the data packet is contained in the packet, and any identified source information could be compared by the WCD against a list of data packet sources, such as a blacklist accessible by the WCD. In addition, the data stored within the data packet may also be examined by the WCD to determine if the data packet contains unwanted content.

As depicted by element 607, the method 600 also comprises, in response to determining that the data packet is an unwanted data packet, configuring the wireless communication device to be in a dormant mode. As with method 400, the dormant mode may require the wireless communication system to send a page message indicating the source of a data packet to the WCD before transmitting any data packets to the WCD.

III. CONCLUSION

Exemplary embodiments and implementations have been described above. Those skilled in the art will understand, however, that changes and modifications may be made to these embodiments and implementations without departing from the true scope and spirit of the invention, which is defined by the claims.

What is claimed is:

1. A method comprising:
 configuring a wireless communication device to be in a dormant mode;
 while in the dormant mode, the wireless communication device (i) receiving, from a wireless communication system component, a page message indicating that a data packet has been addressed to the wireless communication device, wherein the page message includes an identifier of a source of the data packet, (ii) determining whether the source of the data packet is included in a list of data packet sources, and (iii) in response to determining that the source of the data packet is included in the list of data packet sources, transmitting a message from the wireless communication device to the wireless communication system component, the message indicating to the wireless communication system component that the data packet should not be sent to the wireless communication device.

2. The method of claim 1, wherein the identifier of the source of the data packet comprises an IP address.

3. The method of claim 2, wherein the identifier further comprises a destination port identifier.

4. The method of claim 1, wherein determining whether the source of the data packet is included in the list of data packet sources comprises extracting the identifier from the page message.

5. The method of claim 1, wherein the list of data packet sources comprises IP addresses associated with sources of unwanted data packets.

6. The method of claim 1, wherein the list of data packet sources is modifiable by a user of the wireless communication device.

7. The method of claim 1, wherein transmitting the message indicating that the data packet should not be sent to the wireless communication device comprises transmitting a response to the page message.

8. The method of claim 1 wherein the list of data packet sources is stored by the wireless communication device.

9. The method of claim 1 wherein the list of data packet sources is stored by the wireless communication system component.

10. The method of claim 1 further comprising:
 in response to determining that the source of the data packet is not included in the list of data packet sources, configuring the wireless communication device to receive the data packet.

11. The method of claim 10 further comprising transmitting a response to the page message from the wireless communication device indicating that the data packet should be transmitted.

12. A method comprising:
 configuring a wireless communication device to be in a dormant mode;
 while in the dormant mode, the wireless communication device (i) receiving, from a wireless communication system component a page message indicating that a data packet has been addressed to the wireless communication device, wherein the page message includes a source of the data packet, and (ii) determining whether the source of the data packet is included in a list of data packet sources;
 in response to determining that the source of the data packet is included in the list of data packet sources, transmitting a message from the wireless communication device to the wireless communication system component, the message indicating to the wireless communication system component that the data packet should not be sent to the wireless communication device; and
 in response to determining that the source of the data packet is not included in the list of data packet sources, (i) configuring the wireless device to be in an active mode, (ii) receiving the data packet at the wireless communication device, (iii) determining whether the data packet is unwanted, and (iv) in response to determining that the data packet is unwanted, configuring the wireless communication device to be in the dormant mode.

13. The method of claim 12 wherein the list of data packet sources is modifiable by a user of the wireless communication device.

* * * * *